(No Model.)

C. S. PORTER.
DRILL HOLE MAGNET.

No. 432,896.  Patented July 22, 1890.

WITNESSES:
J. H. Clark.
C. Sedgwick.

INVENTOR:
C. S. Porter
BY Munn & Co.
ATTORNEYS

UNITED STATES PATENT OFFICE.

CHARLES SANDERS PORTER, OF IVANHOE FURNACE, VIRGINIA.

DRILL-HOLE MAGNET.

SPECIFICATION forming part of Letters Patent No. 432,896, dated July 22, 1890.

Application filed March 28, 1890. Serial No. 345,709. (No model.)

*To all whom it may concern:*

Be it known that I, CHARLES SANDERS PORTER, of Ivanhoe Furnace, in the county of Wythe and State of Virginia, have invented a new and Improved Drill-Hole Magnet, of which the following is a specification, reference being had to the annexed drawings, forming a part thereof, in which—

Figure 1:
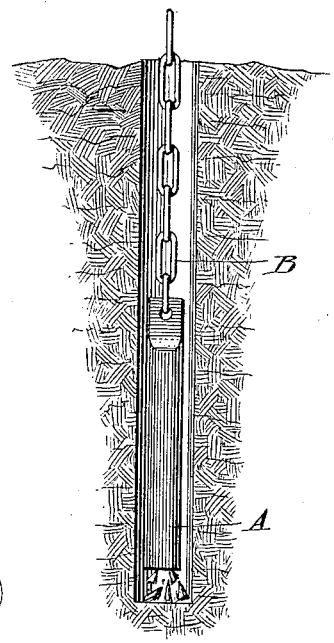
Figure 2:
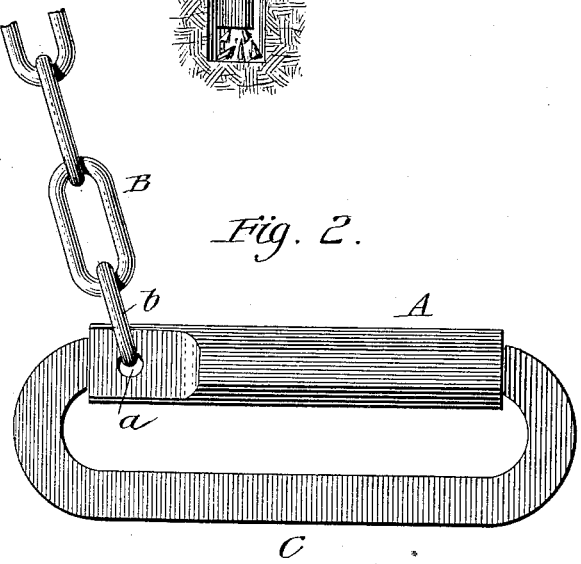

Figure 1 is a side elevation of my improved magnet, and Fig. 2 is an enlarged side elevation showing the magnet and its keeper.

Similar letters of reference indicate corresponding parts in both views.

The object of my invention is to provide a magnet for lifting particles of iron or steel—such as broken drill-bits and pieces of other tools—from drill-holes formed in rock.

My invention consists in a permanent bar-magnet, flattened at one end and perforated, in combination with a chain having one of its links inserted in the perforation of the magnet.

It also further consists in the combination, with the magnet, of a soft-iron keeper formed of a straight bar curved at its ends so as to contact with the ends of the bar-magnet.

The magnet A is formed of a piece of hardened steel of suitable diameter to pass freely down the drill-hole and of suitable length to receive and retain its magnetism without developing consequent poles. One end of the bar A is flattened and reduced in thickness and provided with an aperture $a$, in which is inserted the link $b$ of the chain B. The portion of the chain B which is connected with the bar A is made of non-magnetic material to preserve the strength of the magnet.

The keeper C is formed of a bar of soft iron having its ends curved over toward each other and fitted to tightly clamp the ends of the bar A, so as to preserve the strength of the magnet when it is not in use.

Having thus described my invention, I claim as new and desire to secure by Letters Patent—

1. A drill-hole magnet formed of a bar A, having one end flattened or reduced in thickness and provided with an aperture $a$ for receiving the link $b$ of the chain B, in combination with a chain B, formed in whole or in part of non-magnetic material, substantially as specified.

2. The combination, with the bar-magnet A, of the keeper C, formed of a bar of soft iron, having its ends curved over toward each other and adapted to clamp the ends of the bar-magnet, substantially as specified.

CHARLES SANDERS PORTER.

Witnesses:
J. BURTON PEIRCE,
R. E. HUDDLE.